United States Patent [19]

Doster et al.

[11] Patent Number: 4,614,978
[45] Date of Patent: Sep. 30, 1986

[54] OFFICE COMMUNICATIONS SYSTEM

[75] Inventors: Wolfgang Doster, Dornstadt; Anton Kresser, Wöllstadt; Jürgen Schürmann, Ulm, all of Fed. Rep. of Germany

[73] Assignee: Licentia Patent-Verwaltungs-GmbH, Frankfurt am Main, Fed. Rep. of Germany

[21] Appl. No.: 340,861

[22] Filed: Jan. 20, 1982

[30] Foreign Application Priority Data

Jan. 20, 1981 [DE] Fed. Rep. of Germany ....... 3101543

[51] Int. Cl.$^4$ ............................................ H04N 1/415
[52] U.S. Cl. ................................................... 358/263
[58] Field of Search .................. 382/1, 9, 56; 358/263

[56] References Cited

U.S. PATENT DOCUMENTS

| | | | |
|---|---|---|---|
| 3,920,895 | 11/1975 | Vieri et al. | 179/3 |
| 4,091,424 | 5/1978 | Widergren | 358/260 |
| 4,115,765 | 9/1978 | Hartke | 340/792 |
| 4,120,043 | 10/1978 | Su | 364/900 |
| 4,120,049 | 10/1978 | Thaler et al. | 365/230 |
| 4,122,443 | 10/1978 | Thaler et al. | 382/48 |
| 4,149,145 | 4/1979 | Hartke et al. | 340/748 |
| 4,330,847 | 5/1982 | Kuseski | 364/900 |

FOREIGN PATENT DOCUMENTS 0014758 9/1980 European Pat. Off. .

OTHER PUBLICATIONS

Kaiyoh et al, "A Character Recognition Communication System", Evolutions in Computer Communications (Proceedings of the Fourth International Conference on Computer Communications, Kyoto, Japan, Sep. 26–29, 1978), North Hollard Publishing Co., New York (1978), pp. 565–569.

Aleksander et al, "Guide to Pattern Recognition Using Random-Access Memories," Computers and Digital Techniques, vol. 2, No. 1, Feb. 1979, pp. 24–40.

Primary Examiner—Gareth D. Shaw
Assistant Examiner—John G. Mills
Attorney, Agent, or Firm—Spencer & Frank

[57] ABSTRACT

An office communications system wherein, for the manipulation and/or transmission of text available in an already printed form, a text converter is connected between a word processing terminal and a telecopier. The text converter includes a classifier memory which stores the desired classifier data and a character recognition unit wherein uncompressed image data received from the telecopier are evaluated by means of the classifier data and then transmitted as text data to the word processing terminal for further processing.

9 Claims, 4 Drawing Figures

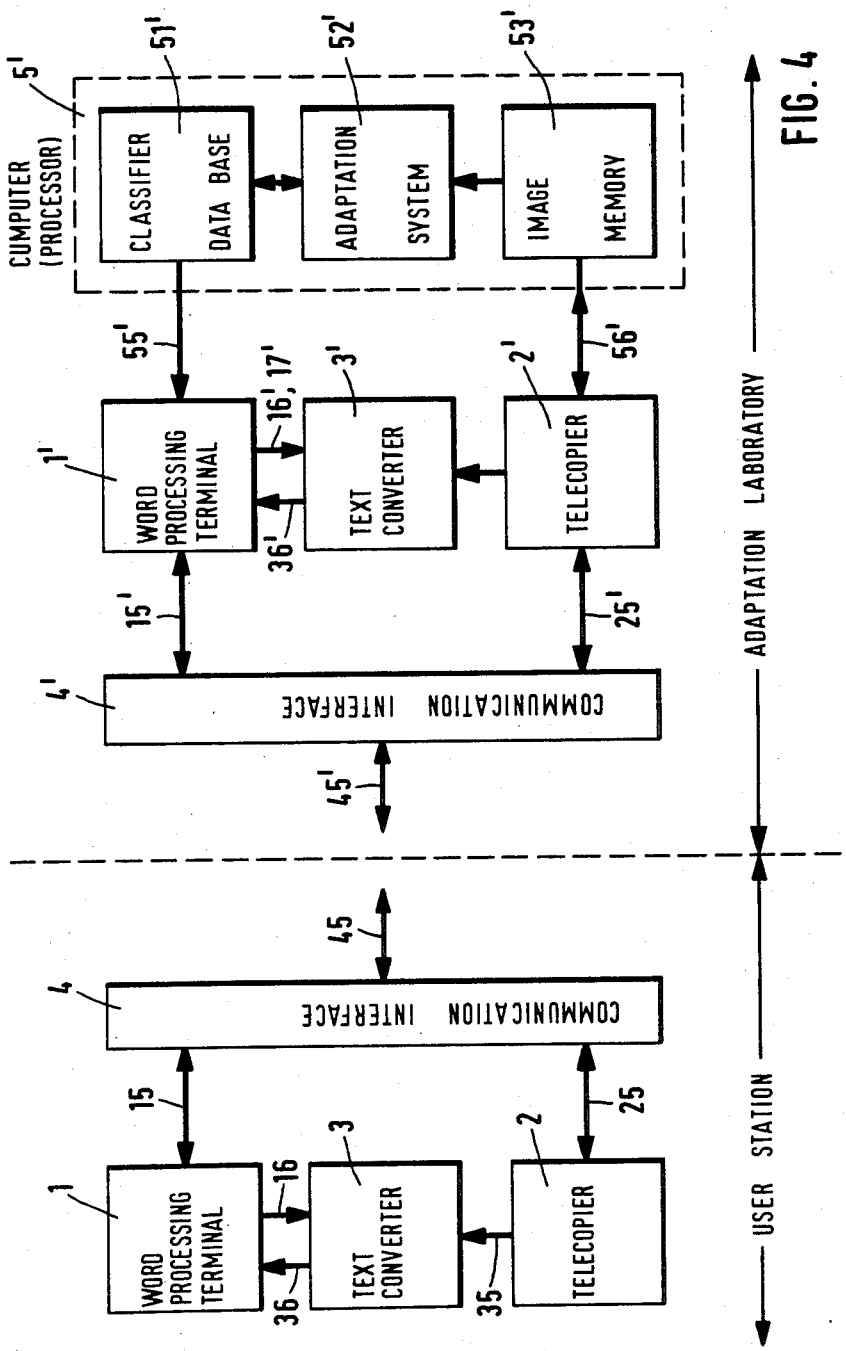

OFFICE COMMUNICATIONS SYSTEM

BACKGROUND OF THE INVENTION

The present invention relates to an office communications system for the manipulation of image text data over a telephone network and including a word processing terminal and a telecopier.

Modern office communications systems include a word processing terminal and a telecopier. Each device per se is connected via a communications interface to a communications network. This communications network may be an intraoffice or public data network or the known telephone network.

The word processing terminal serves to manipulate, send out and receive text data known, for example, as telexes. The terminal includes a monitor for displaying the pages of text received or to be sent out, a storage medium, e.g. a diskette, for storing the text data, a keyboard for text input, and a microprocessor which controls the operating sequences of the word processing terminal.

To send out text data, the pages of text are fed into the word processing terminal by means of the keyboard, are stored by the storage medium and are simultaneously displayed on the monitor so that manipulations, such as reformulation, repositioning or corrections, in the text are possible at any time before send-out.

If the text has been processed in the desired manner, which can be ascertained on the monitor, the text data can be sent out through the communications interface.

For the receipt of text data, such data are entered into the storage medium of the word processing terminal and are displayed on the monitor simultaneously or upon completion of storage. From there the transmitted text data can be read out, if required, by means of a printer.

Pictures, such as, for example, drawings, are received or sent out by the telecopier or facsimile device. For this purpose, the document is inserted into an input/output unit and is scanned there automatically. The resulting uncompressed image data are sent out by a coder, preferably in the form of compressed picture data, via the communications interface.

When receiving picture data, these pass through a decoder which converts the received compressed picture data to the original image data and transfers them to the input/output unit for reconstruction.

If pages covered by typing or printing are to be transmitted, the prior art systems offer two possibilities: either feed the text manually into the word processing terminal via the keyboard or transmit the text as picture data via the telecopier.

The first process is very costly with respect to wages and time, and the second process, when compared with text transmission by means of the word processing terminal, is very costly.

SUMMARY OF THE INVENTION

It is the object of the present invention to improve the state of the art. In particular, a possibility is to be provided to make existing texts available for manipulation (editing) by means of word processing systems and to transmit such texts in an economical manner, e.g. in the future via the telex network of the German Federal Postal Service.

The above object is achieved according to the invention by an office communications system for the manipulation (editing) and/or transmission of image and text data via a communications network, including a word processing terminal connected to a communications network for transmitting and receiving text data via the communications network, a telecopier connected to the communications network for transmitting and receiving image data via the communications network and a text converter means, connected between the word processing terminal and the telecopier, for converting image data of text pages received from the telecopier to character data of the type used by the word processing terminal and for feeding the character data to the word processing terminal for further processing, with the text converter means including a classifier memory for storing desired classifier data and a character recognition unit which is connected in data exchange with the classifier memory and which has a data input connected to an output of the telecopier and a data output connected to an input of the word processing terminal The available texts are now merely scanned by the telecopier and the uncompressed image data are fed to a text converter which detects the specific fed-in characters by means of a classifier associated with the script of the text so as to convert the detected characters to character codes corresponding to those produced when the keys of the keyboard of the word processing terminal are depressed. These character data can be processed with the aid of the word processing terminal and can then be stored and/or sent out. Due to the fact that only text data are being transmitted, instead of image data, the transmission takes place with much less redundance and thus faster and more economically.

With the above described system according to the invention, characters interpreted incorrectly by the character recognition unit of the text converter can be recognized on the monitor of the data processing terminal before they are transmitted and can be corrected via the keyboard. To avoid major correction work, it is advisable to adapt the classifier, i.e., the classifier data, to the respective script of the text being scanned. This can be done in an advantageous manner by designing the classifier memory as a plug-in unit and inserting a classifier memory associated with a particular type of script into the text converter before processing this particular type of script.

If the classifier memory is designed as a random access memory (RAM), the character data corrected in the word processing terminal can be utilized for a corresponding correction of the classifier data of the random access memory in the text convert.

The classifier data for different types of script may also be stored in different diskettes of the word processing terminal and may be transferred in each case from the word processing terminal to the random access memory of the text converter. In that case, the text converter can be realized as a very small structural unit which can be built into either the telecopier or the word processing terminal.

A further advantageous variation for adapting the classifier data to the respective type of script provides that the user transmits, by means of his telecopier, one or a plurality of sample pages of the type of script to be recognized to a special lab. The special lab determines the optimum classifier data and transmits these to the user as text data which are received by the user's word processing terminal and thus enter through the user's storage medium or directly into the classifier memory

BRIEF DESCRIPTION OF THE DRAWINGS

FIG. 4 is a block circuit diagram for the office communications system according to a further embodiment of the invention with inclusion of an adaptation lab.

DETAILED DESCRIPTION OF THE PREFERRED EMBODIMENTS

Figure 1:
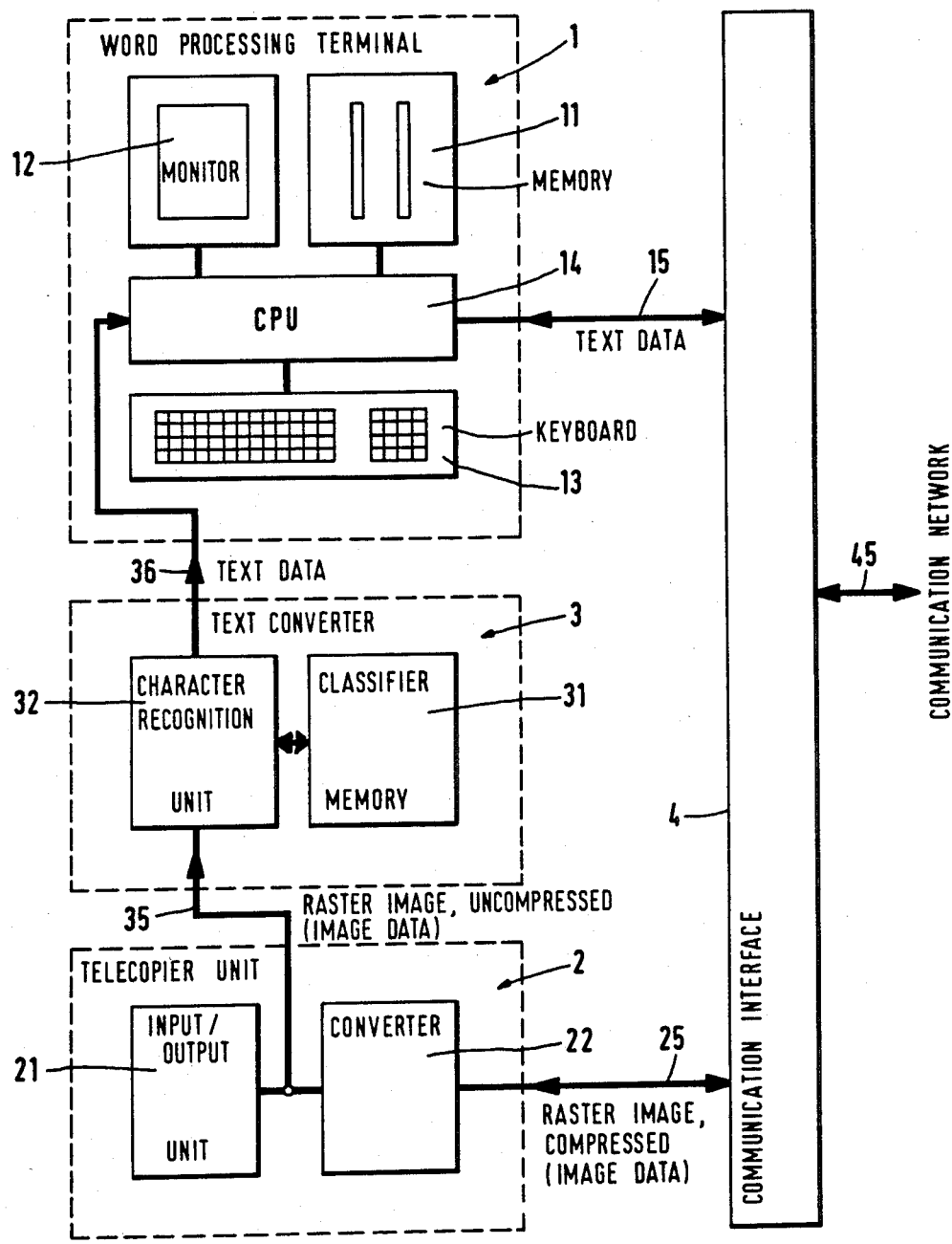
FIG. 1 is a block circuit diagram for an office communications system according to one embodiment of the invention.

FIG. 1 shows the block circuit diagram for an office communications system, according to the invention. It serves to transmit image and text data via a communications network, for example, a telephone network, and includes a word processing terminal 1, a telecopier 2, and a text converter 3 which is connected between the word processing terminal 1 and the telecopier 2. The word processing terminal 1 and the telecopier 2 are each connected via a respective connecting line 15 or 25 with a communications interface 4 which enables the data to be transmitted over a communications network 45, generally the public telephone network. The text converter 3 serves the purpose of converting image data of pages of text emitted by the telecopier 2 into character data of the type used by the word processing terminal 1, by means of a character recognition unit 32 which is in data exchange with a classifier memory 31, and of then transmitting the thus converted character data to the word processing terminal 1 for further processing.

The word processing terminal 1 includes the monitor 12, the memory or storage medium 11, the text input keyboard 13 and the central processing unit (CPU) or microprocessor 14.

The telecopier 2 essentially comprises the input/output unit 21 and the converter 22 for coding image data to be sent out via the interface 4 or for decoding incoming image data from the interface 4.

The operation of these units has already been explained above and is state of the art. The novel feature in the system according to the invention is the inclusion of the text converter 3 which essentially comprises the character recognition unit 32 and the classifier memory 31.

The text converter 3 converts text data from their image form into the coded representation of the data and text processing system e.g., the terminal 1. The starting point is the binary raster image produced by either the input/output unit 21 (for newly scanned data) or the converter 22 (for data received via 25) of the telecopier 2. In principle, it is here of no consequence, whether the user's own telecopier or a telecopier connected in the communications network 45 is used as the scanning element for the image data. The text converter 3 simply receives the binary raster image produced by unit 21 or converter 22 and furnishes coded text data, for example, data coded in the same manner as that provided by the text input keyboard 13, to the word processing terminal 1 of the user's station. There the text data can be stored in the storage memory or medium 11 and displayed on the monitor 12. In this way it is possible to edit and check the text data before they are sent out. After editing, the text data can be transmitted to any desired outside stations from the word processing terminal 1 over existing paths, i.e. line 15 for the text data, the communications interface 4 and the communications network 45.

In order to be able to operate in the described manner, the text converter 3 must be equipped with a character recognition device. The significant component of such a device, the individual character recognition unit 32, must have parameters which are adapted to the respective type of script to be read. The data quantity which describes this adaptation state is called the classifier and is stored in the classifier memory 31 which is connected to the character recognition unit 32.

There are various types of classifiers:

Single font classifiers: These data have been determined for a particular type of script which can thus be converted to text data with particularly great reliability.

Multifont classifier: With these data it is possible to read a certain selection of different types of script, e.g. the conventional straight-line typewriter scripts.

Depending on the particular use, different special classifiers may be required.

Usually, the classifier is furnished by the manufacturer of the text converter and is of the multifont type. It is then generally stored in a read only memory (ROM) and is thus part of the text converter. However, for special cases, for example, for reading texts involving unusual scripts, it may be advisable to use a specialized single font classifier instead of using the multifont classifier furnished by the manufacturer as basic equipment. Consequently, in order to permit use of the system for such special cases, the classifier memory is preferably designed as a plug-in unit, so that a classifier memory 31 with the most favorable classifier data can then be used for each respective type of script.

Under certain circumstances it may be of advantage to keep the classifier data in a random access memory (RAM). The stored data can then be replaced by other classifier data at any time by rerecording the material in the memory.

There exist various possibilities, when using a random access memory as the classifier memory 31, to transmit the classifier to the station in which the text converter 3 is installed.

Figure 2:
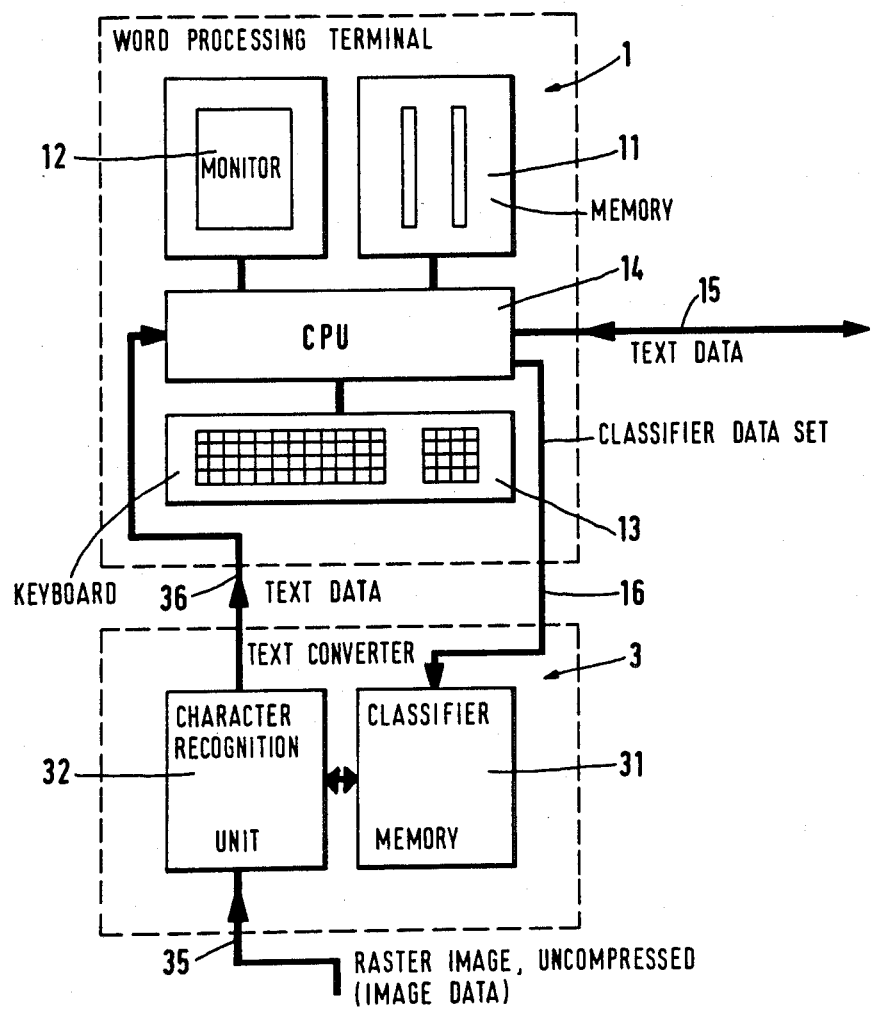
FIG. 2 is a block circuit diagram showing a modified use of the word processing terminal and the text converter of FIG. 1 in order to transfer classifier data into the classifier memory.

For example, the classifier memory 31 may advantageously be changed by a special diskette which contains the classifier data and can be inserted into and used as the storage medium 11 of the word processing terminal 1. For this purpose, as shown in FIG. 2, the text converter 3 is equipped with a further terminal for charging the classifier memory 31 so that in this case the classifier memory 31 can be charged by the special diskette of the storage medium 11 via the microprocessor 14 and the connecting line 16.

However, advisably the classifier can also be transmitted directly via the communications network and the connecting line 15 from a shipper or the manufacturer of the text converter. The classifier data then pass as text data over the line 15, the microprocessor 14 of the word processing terminal 1 and the connecting line 16 into the classifier memory 31.

Figure 3:
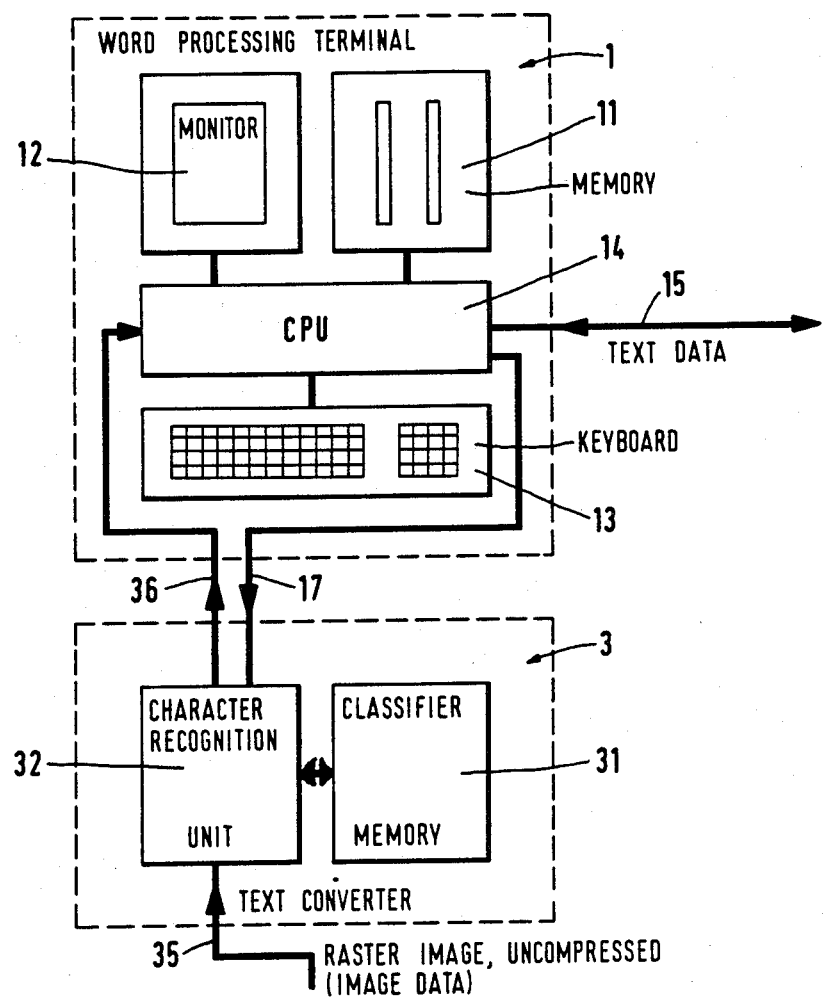
FIG. 3 is a block circuit diagram showing a further modification of the word processing terminal and the text converter of FIG. 1 in order to provide for stepwise adaptation of the classifier data.

It may also be of advantage to equip the text converter 3 with the capability of in-step adaptation. This modification of the system is shown in FIG. 3 and is capable of changing its own adaptation state starting from an original multifont classifier in the direction toward the specialized single font classifier. The user must then set a special mode of operation, identified for example as "learning" in which a connection 17 is made between the microprocessor 14 and the character recognition unit 32 and must guide the entire process correctly. For this purpose, the page of text displayed on the monitor 12 is corrected by means of the keyboard 13, the page of text to be read is possibly scanned once more by the telecopier 2 and simultaneously the corrected text data are transmitted from the word processing terminal 1 over the connecting line 17 to the character recognition unit 32. The classifier is then corrected in the character recognition unit 32, and the corrected classifier is thereafter stored in the classifier memory 31. Thus the classifier has been adapted to the specific type of script to be read and the transmission of many pages of text in this type of script can take place practically without errors.

Since a character recognition unit 32 for in-step adaptation is rather complicated and expensive and will only rarely be fully utilized, it is more favorable to offer the task of adapting the classifier as a service, for example as a service by the manufacturer of the text converter who operates a special adaptation laboratory for this purpose.

FIG. 4 shows an advantageous variation of the office communications system which utilizes the services of an adaptation laboratory. Between the user station and the adaptation laboratory there is the communications network 45 or 45', respectively.

As shown, the user station must have: the word processing terminal 1, the text converter 3, the telecopier 2 and the communications interface 4. The classifier memory in the text converter 3 must be a random access memory and a data path 16, as shown in detail in FIG. 2, must be available. Since the drawing figures identify identical units with the same reference numerals, it can easily be seen that the user station in FIG. 4 corresponds essentially to the office communications system shown in FIG. 1 equipped with the features shown in FIG. 2.

The units of the adaptation laboratory are in part the same as at the user's station. Again the same units are identified with the same reference numerals but are given primes for distinction.

As at the user's station, the adaptation laboratory is equipped with a word processing terminal 1' and a telecopier 2' connected to a communications interface 4' as well as a text converter 3'. Additionally, the text converter 3' is connected, via the word processing terminal 1' with a data connection line 55' for classifier data and with a classifier data base 51' which is connected to a computer supported adaptation system 52'.

Moreover, the telecopier 2' and thus the text converter 3' are connected with a connecting line 56' leading to a memory 53' for telecopied images and this memory is also in communication with the computer supported adaptation system 52'.

The classifier data base 51', the adaptation system 52' and the image data base (image memory) 53' are usually combined in a computer system 5'.

Advisably, the text converter 3' is designed, as already described in connection with FIG. 2 and FIG. 3, so that in-step adaptation can take place.

The given configuration of system components permits multifaceted use. Thus, a classification specialist if he is familiar with the particular type of script can select, upon the request of a user and after transmission of one or a plurality of sample pages to the adaptation laboratory, a suitable classifier from its classifier library or data base 51'. If necessary, the specialist can perform an in-step adaptation and thus quickly adapt the available classifier optimally to the type of script before him by means of the text converter 3' which has been specially designed for this purpose. If, however, the particular type of script is not available in the classifier library or data bank 51', the specialist can perform a complete classifier adaptation or classifier iteration via the computer supported adaptation system 52'.

The resulting classifier can be transmitted to the user, possibly after testing in units 1', 2' and 3' of the adaptation lab, by means of the word processing terminal 1'.

Commercially available word processing terminals and telecopiers can be used to realize the system according to the invention, with the telecopiers 3 having to be equipped with the above-described data terminal for the connecting line 35 for uncompressed image, and with the word processing terminal 1 having to be equipped with the connecting line 36 for the input of character data and the connecting line 16 or 17, for the emission of classifier or character data, respectively.

The character recognition unit 32 of the text converter 3 may be a device, for example, as described in the book by Dr. eng. J. Schürmann, "Polynomklassifikatoren für die Zeichenerkennung" [Polynomial Classifiers For Character Recognition] published by R. Oldenburg Verlag, Munich, Vienna, 1977. A character recognition unit for the in-step adaptation is described, for example, in the periodical "Elektronische Rechenanlagen" [Electronic Computer Systems], Volume 20 (1978), No. 1, pages 15-23, continued in No. 2, pages 65-71.

The classifier data base 51' of the adaptation laboratory and the image data base 53' are components of a commercially available computer system.

The computer supported adaptation system 52' employed may be, for example, a program system assembled according to the instructions in the above-mentioned book by Dr. eng. J. Schürmann.

It will be understood that the above description of the present invention is susceptible to various modifications, changes and adaptations, and the same are intended to be comprehended within the meaning and range of equivalents of the appended claims.

What is claimed is:

1. An office communications system for the manipulation and/or transmission of image and text data via a communications network comprising in combination:
   a word processing terminal connected to a communications network for transmitting and receiving text in the form of character data via the communications network; a telecopier connected to the communications network for transmitting and receiving image data via the communications network; and means for permitting the editing of text in the form of image data supplied by said telecopier and the transmission of said text as character data via said communications network, said means including text converter means, connected between said telecopier and said word processing terminal, for converting image data of text pages received from said telecopier to character data of the code type used by said word processing terminal and for feeding the converted data to said word processing terminal, said text converter means including a character recognition unit having a data input connected to an output of said telecopier and a data output connected to an input of said word processing terminal, and a classifier memory for storing desired classifier data connected in data exchange with said character recognition unit.

2. A system as defined in claim 1 wherein said word processing terminal, said telecopier and said text converter means comprise one of a plurality of similar user stations connected to said data communications system.

3. A system as defined in claim 1 wherein said classifier memory is a plug-in unit.

4. A system as defined in claim 1 or 2 wherein said classifier memory is a read only memory.

5. A system as defined in claim 1 wherein: said classifier memory is a random access memory (RAM); and said text converter means is provided with a further input for receiving classifier data for charging said random access memory.

6. A system as defined in claim 5 wherein said word processing terminal includes a diskette storage means for storing classifier data; and wherein said further input is connected to an output of said word processing terminal.

7. A system as defined in claim 5 wherein: said further input is connected to an output of said word processing terminal; and wherein means are provided at a location remote from said word processing terminal for transmitting desired classifier data to said word processing terminal via the communications network whereby said classifier memory of said text converter means can be charged with classifier data transmitted via the word processing terminal.

8. A system as defined in claim 7 wherein: said word processing terminal, said text converter means and said telecopier comprise one of a plurality of similar user stations connected to said data communications network; and said means for transmitting classifier data to said word processing terminal comprises an adaptation laboratory including means responsive to receipt of a text page transmitted via said communications network by the telecopier of one of said user stations for determining the desired classifier data for the received text pages and for transmitting the determined said desired classifier data via the communications network to the word processing terminal of said one user station.

9. A system as defined in claim 1 wherein said word processing termined includes a central processing unit, and a keyboard for entering character data, a memory or storing character data, and a monitor for displaying character data, all connected to said central processing unit; and wherein said input of said word processing terminal is an input to said central processing unit.

* * * * *